(12) United States Patent
Saito

(10) Patent No.: US 8,425,087 B2
(45) Date of Patent: Apr. 23, 2013

(54) LUMINOUS FLUX CONTROL MEMBER AND OPTICAL APPARATUS HAVING THE SAME

(75) Inventor: Tomohiro Saito, Saitama (JP)

(73) Assignee: Enplas Corporation, Saitama (JP)

( * ) Notice: Subject to any disclaimer, the term of this patent is extended or adjusted under 35 U.S.C. 154(b) by 147 days.

(21) Appl. No.: 13/162,131

(22) Filed: Jun. 16, 2011

(65) Prior Publication Data
US 2011/0310618 A1 Dec. 22, 2011

(30) Foreign Application Priority Data

Jun. 16, 2010 (JP) ................................. 2010-137096

(51) Int. Cl.
*F21V 13/04* (2006.01)
(52) U.S. Cl.
USPC ........... 362/309; 362/338; 362/297; 313/111; 313/116
(58) Field of Classification Search .......... 313/498–512; 362/235
See application file for complete search history.

(56) References Cited

U.S. PATENT DOCUMENTS

| 4,390,930 | A * | 6/1983 | Herst et al. .................... 362/224 |
| 6,386,743 | B1 * | 5/2002 | Futami et al. ................. 362/516 |
| 7,441,927 | B1 * | 10/2008 | Kling ............................ 362/297 |
| 2007/0147041 | A1 | 6/2007 | Shiratsuchi et al. | |
| 2008/0212328 | A1 * | 9/2008 | Minano et al. ................ 362/309 |

FOREIGN PATENT DOCUMENTS

JP 2007-134316 A 5/2007

* cited by examiner

*Primary Examiner* — Tracie Y Green
(74) *Attorney, Agent, or Firm* — Washida & Associates

(57) ABSTRACT

A luminous flux control member can stabilize an optical performance, make manufacturing easy and improve efficiency of use of light at the same time. A reflection surface (15) is formed in a surface shape, so that an extreme end section of the reflection surface (15) that is the most distant from an emission area (5) is positioned further inward in the radial direction than a base end section that is the closest to the emission area (5), and the reflection surface (15) intersects once a virtual surface that is inclined with respect to an optical axis connecting between the extreme end section and the base end section. The surface shape suppresses an offset of a light distribution of light emitted from the emission area (5) from a designed light distribution due to an offset between an optical axis and the center axis of light emitted from a light source.

6 Claims, 13 Drawing Sheets

LUMINOUS FLUX CONTROL MEMBER AND OPTICAL APPARATUS HAVING THE SAME

CROSS REFERENCE TO RELATED APPLICATIONS

The disclosure of Japanese Patent Application No. 2010-137096, filed on Jun. 16, 2010, including the specification, drawings and abstract, is incorporated herein by reference in its entirety.

TECHNICAL FIELD

The present invention relates to a luminous flux control member and an optical apparatus having the luminous flux control member. In particular, the present invention relates to a luminous flux control member and an optical apparatus having the luminous flux control member preferable to illuminate light emitted from a light source to an illumination-target surface.

BACKGROUND ART

Conventionally, there is known a lens (so-called a Fresnel lens) having a lens surface that is divided to a plurality of concentric areas and formed in a saw blade shape (hereinafter called a Fresnel shape) as a lens suitable for reducing thickness and weight. This kind of lens is applied to a use in which a reduction of thickness is particularly advantageous and to a use in which an influence of diffraction can be ignored (for example, a magnifier, and an illumination system) and the like.

When this kind of lens is assembled into a product for illumination, a light source such as an LED (light emitting diode) and the like is fixed to a surface of a lens formed in the Fresnel shape after the center axis of light emitted from the light source is coaxially aligned with an optical axis of the lens.

Further, a Fresnel shape of this kind of lens includes a type having only a refraction surface for refracting light emitted from a light source and a type including a reflection surface in addition to the refraction surface. The latter type (the Fresnel shape including the refraction surface and the reflection surface) can capture and converge light emitted from a light source (for example, LED) at a large extending angle more efficiently than the former type (the Fresnel shape including only the refraction surface).

However, in Fresnel shape including the reflection surface, since a variation of an emission angle to a variation of an incidence angle on a reflection surface is larger than on the refraction surface, the variation of the incidence angle significantly influences a light distribution of light emitted from a lens, that is, a distribution of brightness of emitted light.

Therefore, when an incidence angle of light on a Fresnel-shaped reflection surface is offset from a designed incidence angle because, for example, an attachment error between a lens and a light source (an axis offset by which the center axis of light emitted from the light source is offset in a vertical direction to an optical axis of the lens) occurs, an emission angle of light on the reflection surface, that is, a reflection angle is significantly offset from a designed emission angle (reflection angle).

In the case, since a light distribution of light emitted from the lens is significantly offset from a designed light distribution, a problem arises in that satisfactory optical characteristics cannot be obtained.

As a method of solving the problem, it is contemplated to increase the number of projecting sections having a saw-blade-shaped cross section in a Fresnel shape as shown in, for example, patent literature 1. According to the method of the conventional art, an offset of light distribution due to an axis offset can be suppressed to some extent.

CITATION LIST

Patent Literature

PTL 1: Japanese Patent Application Laid-Open No. 2007-134316

SUMMARY OF INVENTION

Technical Problem

However, in a configuration in which the number of projecting sections increases in the Fresnel shape, a shape of a metal mold for molding a lens becomes complicated. Further, since a loss of light upon reflection increases because the respective projecting sections have an excessively small reflection surface, efficiency of use of light is deteriorated.

It is therefore an object of the present invention to provide a luminous flux control member and an optical apparatus including the luminous flux control member in which an optical performance can be stabilized, manufacturing can be made easy, and efficiency of use of light can be improved at the same time.

Solution to Problem

A luminous flux control member according to the present invention has: an incident area on which light emitted from a light source is incident; and an emission area which opposes the incident area in an optical axis direction and which emits light having entered the incident area, toward an illumination-target surface side, and, with this luminous flux control member: the incident area comprises a projecting section which an annular shape about an optical axis when viewed from an optical axis direction and which has a cross section of a saw blade shape; the projecting section comprises: a first inclined surface on which part of the light emitted from the light source is incident and which refracts the incident light; and a second inclined surface which is formed in a further outward position in a radial direction than the first inclined surface and which totally reflects the light having entered the projection section from the first inclined surface toward the emission area; and the second inclined surface is formed in a surface shape so that an extreme end section of the second inclined surface which is most distant from the emission area is positioned more inward in the radial direction than a base end section which is closest to the emission area and the second inclined surface intersects once a virtual surface that is inclined with respect to the optical axis which connects between the extreme end section and the base end section. Accordingly, the surface shape suppresses an offset of a light distribution of light emitted from the emission area from a designed light distribution due to an offset between the optical axis and the center axis of light emitted from the light source.

Then, part of light source light having a gradient of intensity, in which intensity is sequentially lowered from a center axis side to a periphery side (wide angle side), passes through the first inclined surface of the projecting section, light in the part of the light source light having a relatively low intensity reaches the extreme end section side of the second inclined surface, and light in the part of the light source light having a relatively high intensity reaches the base end section side of the second inclined surface. As described above, the second inclined surface is formed so as to intersect the virtual surface once.

Advantageous Effects of Invention

According to the present invention, when light is totally reflected by the second inclined surface, light is emitted in a direction where an intensity gradient of light is alleviated from the extreme end section side to the base end section side of the second inclined surface. This is not influenced by whether or not an axis offset occurs. Accordingly, even if an axis offset occurs, it can be suppressed that a light distribution of light emitted from an emission area (that is, light from a luminous flux control member) is significantly offset from a designed light distribution. According to the present invention, since the suppression of the offset of light distribution due to the axis offset can be realized by the surface shape of the second inclined surface in place of the number of projecting sections, it is not necessary to form many fine projecting sections to a metal mold for molding the luminous flux control member and thus a metal mold structure can be simplified. Further, according to the present invention, since a total reflection surface having a sufficient size can be used by reducing the number of the projecting sections, a sufficient amount of light can be obtained in the second inclined surface. As a result, optical performance can be stabilized, manufacturing can be made easy, and the efficiency of use of light can be improved at the same time.

DESCRIPTION OF EMBODIMENTS

An embodiment of the present invention will be described below in detail with reference to the accompanying drawings.

Figure 1:
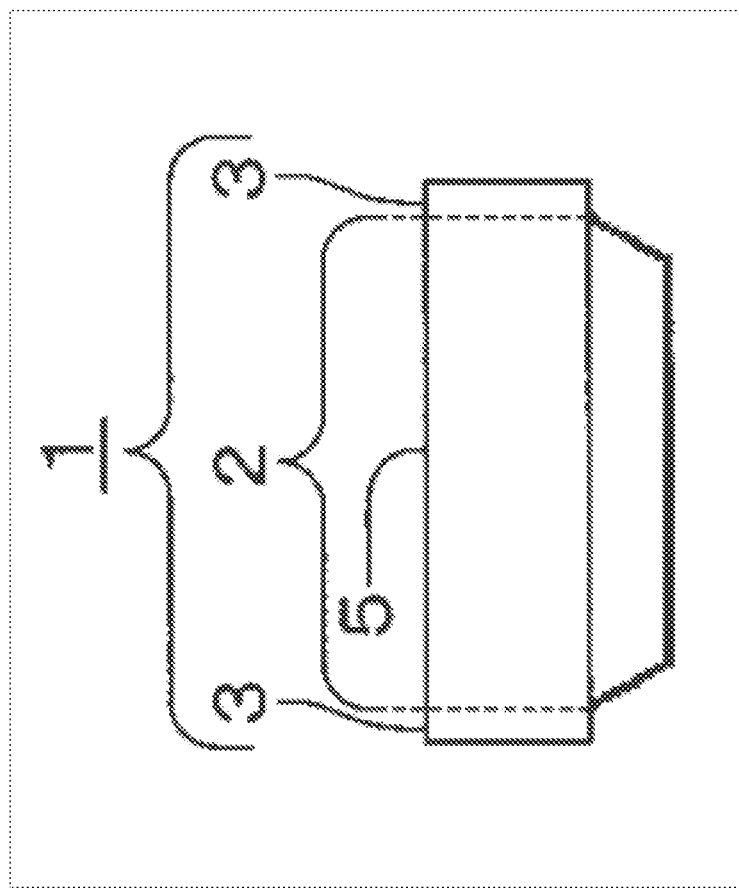
FIG. 1 is a front view showing an embodiment of a luminous flux control member according to the present invention.
Figure 2:
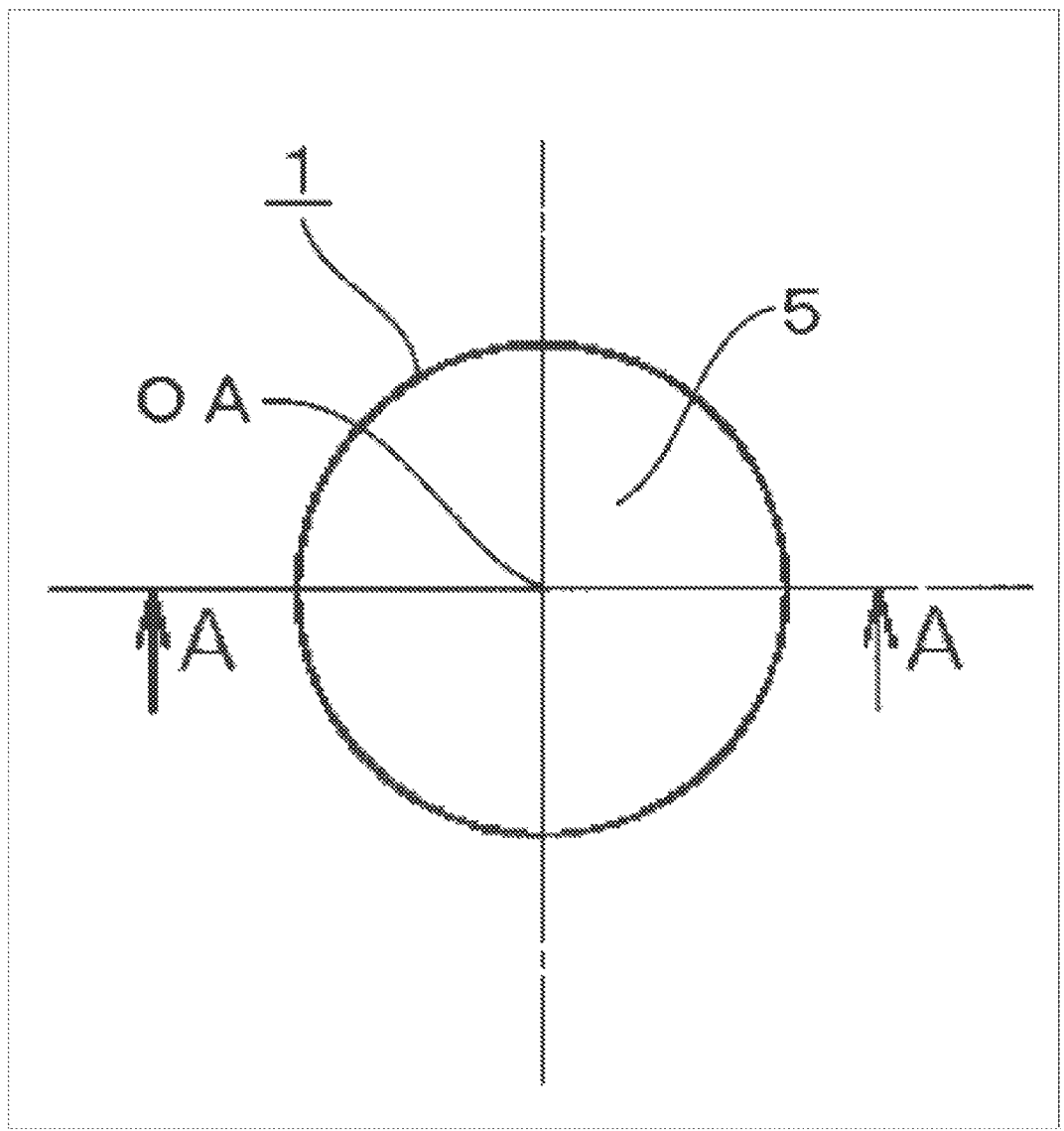
FIG. 2 is a plan view of FIG. 1.
Figure 3:
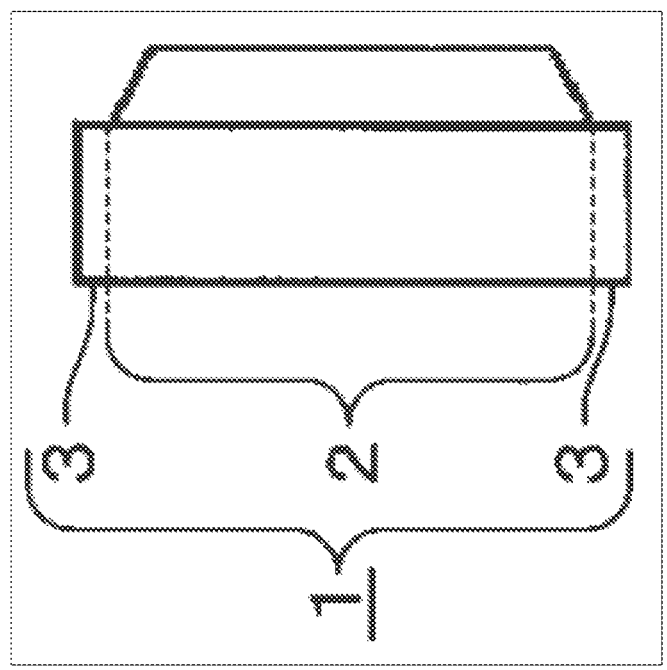
FIG. 3 is a right side view of FIG. 2.

FIG. 1 is a front view showing a luminous flux control member in the embodiment. FIG. 2 is a plan view of FIG. 1. FIG. 3 is right side view of FIG. 2. Further, FIG. 4 is an A-A sectional view of FIG. 2.

As shown in FIG. 1, luminous flux control member 1 in the embodiment is composed of circular luminous flux control unit 2 and cylindrical edge section 3 that surrounds luminous flux control unit 2 on a plan view. Luminous flux control member 1 is molded by an injection molding method and the like using a transparent resin material such as PMMA (polymethyl methacrylate), PC (polycarbonate), COP (cycloolefin resin), EP (epoxy resin), silicone resin, and the like.

Figure 4:
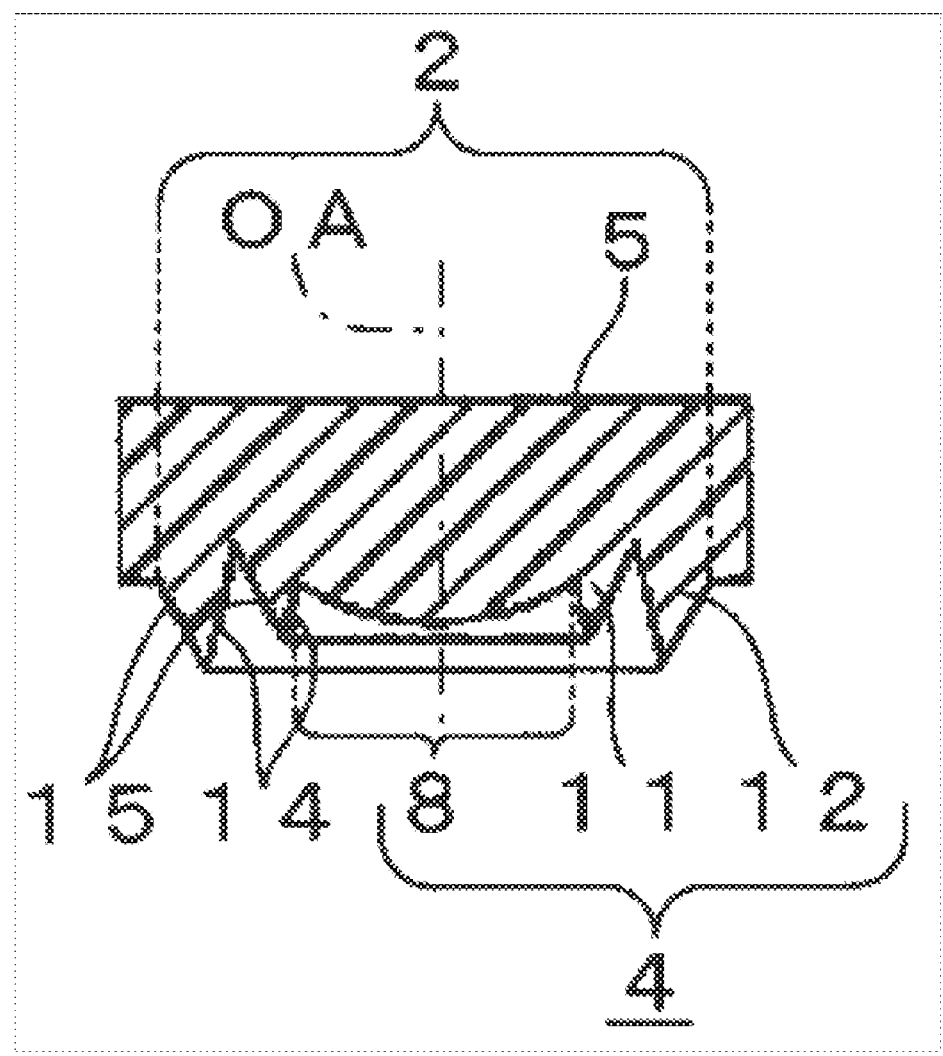
FIG. 4 is an A-A sectional view of FIG. 2.

As shown in FIG. 4, luminous flux control unit 2 has two luminous flux control surfaces 4, 5 of incident area 4 and emission area 5 which are to oppose each other in optical axis OA direction.

Figure 5:
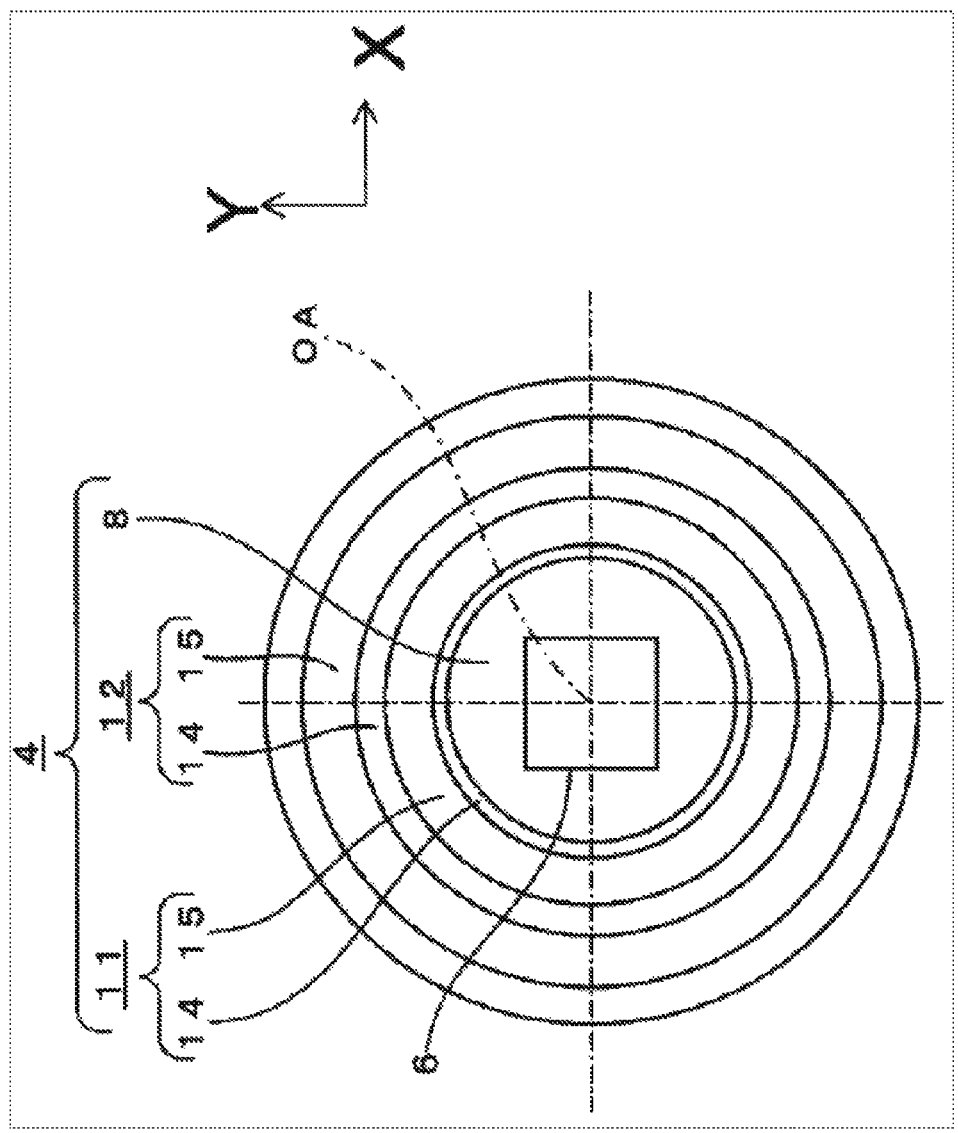
FIG. 5 is a schematic a lower surface view showing an embodiment of the luminous flux control member and an optical apparatus according to the present invention.
Figure 6:
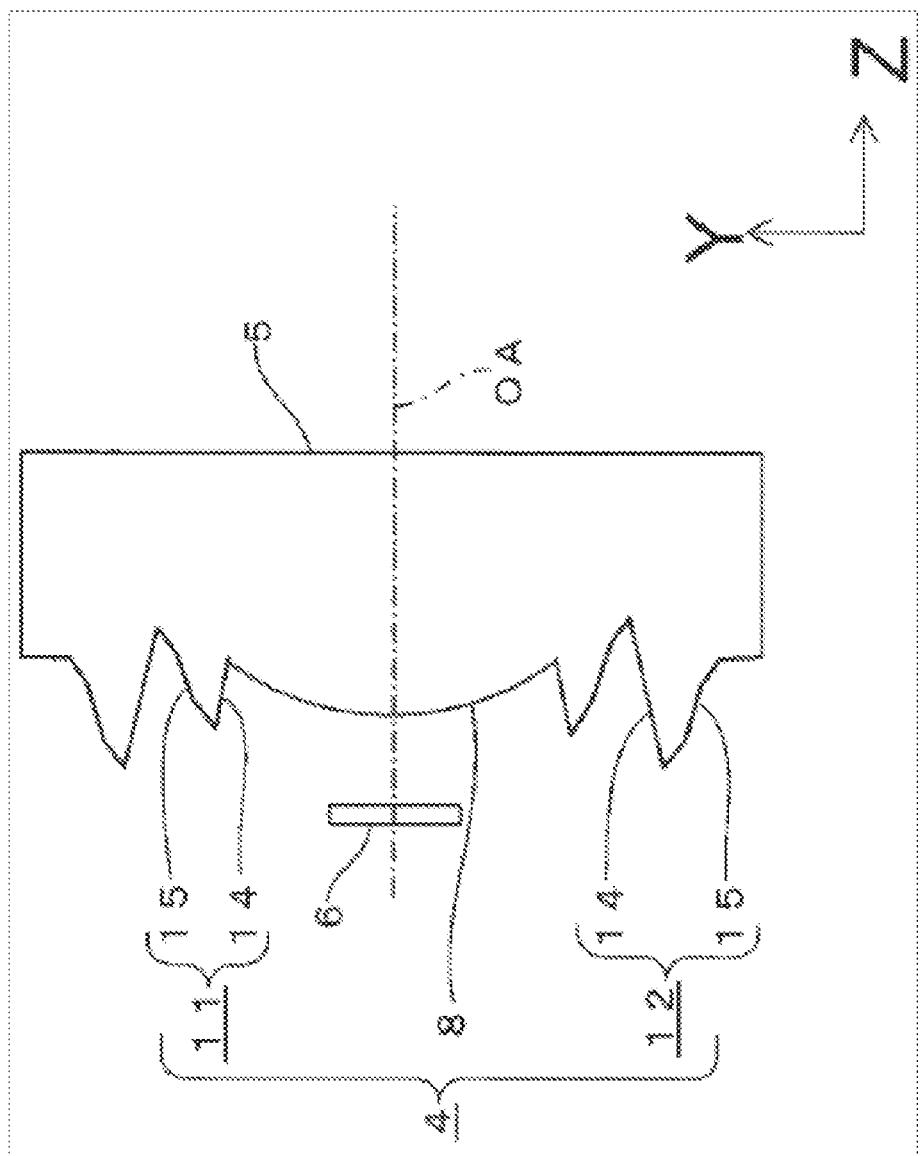
FIG. 6 is a schematic longitudinal sectional view showing the embodiment of the luminous flux control member and the optical apparatus.

As shown in FIG. 5 and FIG. 6, light emitted from light source 6 arranged in a position to oppose incident area 4 on optical axis OA, is incident on incident area 4. Note that light source 6 emits light having a predetermined extending angle in optical axis OA direction (Z-axis direction in FIG. 6) to luminous flux control member 1 side. Further, the center axis of light emitted from light source 6 matches with optical axis OA of luminous flux control member 1 in design. This light source 6 may be an LED.

Light that is incident on incident area 4 travels inside luminous flux control unit 2, and then output to the illumination-target surface side from emission area 5.

Incident area 4 will be described below in more detail. As shown in FIG. 4 to FIG. 6, incident area 4 has circular (convex lens surface shaped) central section 8 about optical axis OA including an intersecting section (surface apex point) about optical axis OA including an intersecting point (surface apex point) with optical axis OA, first concentric projecting section 11 surrounding central section 8, and second concentric projecting section 12 surrounding first projecting section 11.

First projecting section 11 and second projecting section 12 are connected to each other in a radial direction (X-axis and Y-axis directions in FIG. 5).

Further, first projecting section 11 and second projecting section 12 have a shape exhibiting an annular shape about optical axis OA when viewed from optical axis OA direction and a longitudinal cross section (A-A cross section) of a saw blade shape.

The surface shape of incident area 4 corresponds to a Fresnel shape. However, a Fresnel shape in the embodiment has a feature different from a conventional shape as described later.

Further, each of first projecting section 11 and second projecting section 12 has refraction surface 14 as a first inclined surface and reflection surface 15 as a second inclined surface formed in an outward position (side to distance from optical axis OA) in the radial direction based on optical axis OA with respect to refraction surface 14.

Part of light emitted from light source 6—that is, part of light to be incident on entire incident area 4—is incident on refraction surface 14. The light incident on surface 14 is refracted to reflection surface 15 side by refraction surface 14.

In contrast, light from light source 6, refracted by refraction surface 14, is incident on reflection surface 15 from inside projecting sections 11 and 12, at an incidence angle equal to or larger than a critical angle. The incident light is totally reflected to emission area 5 side by reflection surface 15.

As a characteristic configuration of a Fresnel shape in the embodiment, the surface shape of reflection surface 15 is formed such that an extreme end section most distant from emission area 5 in reflection surface 15 in optical axis OA direction is positioned further inward in the radial direction than the base end section that is the closest to emission area 5 in reflection surface 15 in optical axis OA direction. Further, in the embodiment, the surface shape of reflection surface 15 is formed to intersect once a virtual surface that is inclined with respect to optical axis OA that connects between the extreme end section to the base end section.

The surface shape of reflection surface 15 has a function for suppressing an offset of a light distribution of light emitted from emission area 5 from a designed light distribution, the offset being caused by an axis offset between optical axis OA of luminous flux control member 1 and the center axis of light emitted from light source 6.

That is, when light, which is emitted from light source 6 arranged as shown in FIG. 6 is light having a predetermined extending angle which has a gradient of intensity (in other words, distribution of light) that is sequentially lowered from the center axis side to a peripheral side (for example, light emitted from an LED), light of light source 6, which enters inside luminous flux control member 1 from refraction surface 14 and enters inside reflection surface 15, naturally has a gradient of intensity. Specifically, the light of light source 6 has a gradient of intensity which sequentially increases from the extreme end section side to the base end section side of reflection surface 15.

On the premise, if reflection surface 15 is supposed to be a flat surface (corresponding to a virtual surface), the gradient of intensity on reflection surface 15 is kept as it is even after reflection on reflection surface 15. In this virtual configuration, when the center axis of the light emitted from light source 6 is offset in a vertical direction (the X- and Y-axes direction in FIG. 5) with respect to optical axis OA of luminous flux control member 1, a reflection direction light from reflection surface 15 is offset from a reflection direction in design while keeping the gradient of intensity. As a result, a light distribution of light emitted from luminous flux control member (a distribution of brightness) is significantly offset from the designed light distribution.

In contrast, when reflection surface 15 is formed in a surface shape to intersect the virtual surface once, light that is incident on reflection surface 15 is reflected in a direction in which the gradient of intensity is alleviated after the light is reflected, and this does not depend on the presence or absence of axis offset.

Thus, according to the surface shape of reflection surface 15 of the embodiment, even if an axis offset occurs, the distribution of light output from emission area 5 (that is, light output from luminous flux control member 1) can be prevented from being offset from the designed light distribution (without axis offset).

Further, according to the embodiment, since the suppression of the offset of light distribution due to the axis offset can be realized by the surface shape of reflection surface 15 in place of the number of the projecting sections 11 and 12, it is not necessary to form a plurality of fine projecting portions to a metal mold for molding luminous flux control member 1 and thus a structure of the metal mold can be simplified. Further, since reflection surface 15 having a sufficient size can be used by reducing the number of projecting sections 11 and 12, a sufficient amount of reflected light can be obtained in reflection surface 15 and the number of extreme end sections in the projecting sections which are liable to insufficient transcription from a metal mold to a molded product can be also reduced. Accordingly, a loss of light in the extreme end sections of the projecting sections, where the transcription is insufficient, can be also suppressed to a minimum.

As a result, an optical performance can be stabilized by suppressing an offset of light distribution due to an axis offset, manufacturing can be made easy by a simple metal mold shape, and efficiency of use of light can be improved by obtaining a sufficient amount of reflected light at the same time.

Note that, in the embodiment, the surface shape of reflection surface 15 may be formed in a polygonal surface shape in which a plurality of planes are connected so as to be sequentially bent from an extreme end section side to a base end section side. In the case, the number of planes to be connected may be appropriately selected depending on a concept. However, from a view point of making manufacturing easy, it is preferable that the number of planes to be connected is as small as possible within a limit in which the offset of light distribution can be suppressed.

By this configuration, since the surface shape of reflection surface 15 can be simplified, luminous flux control member 1 can be manufactured more easily.

Figure 7:
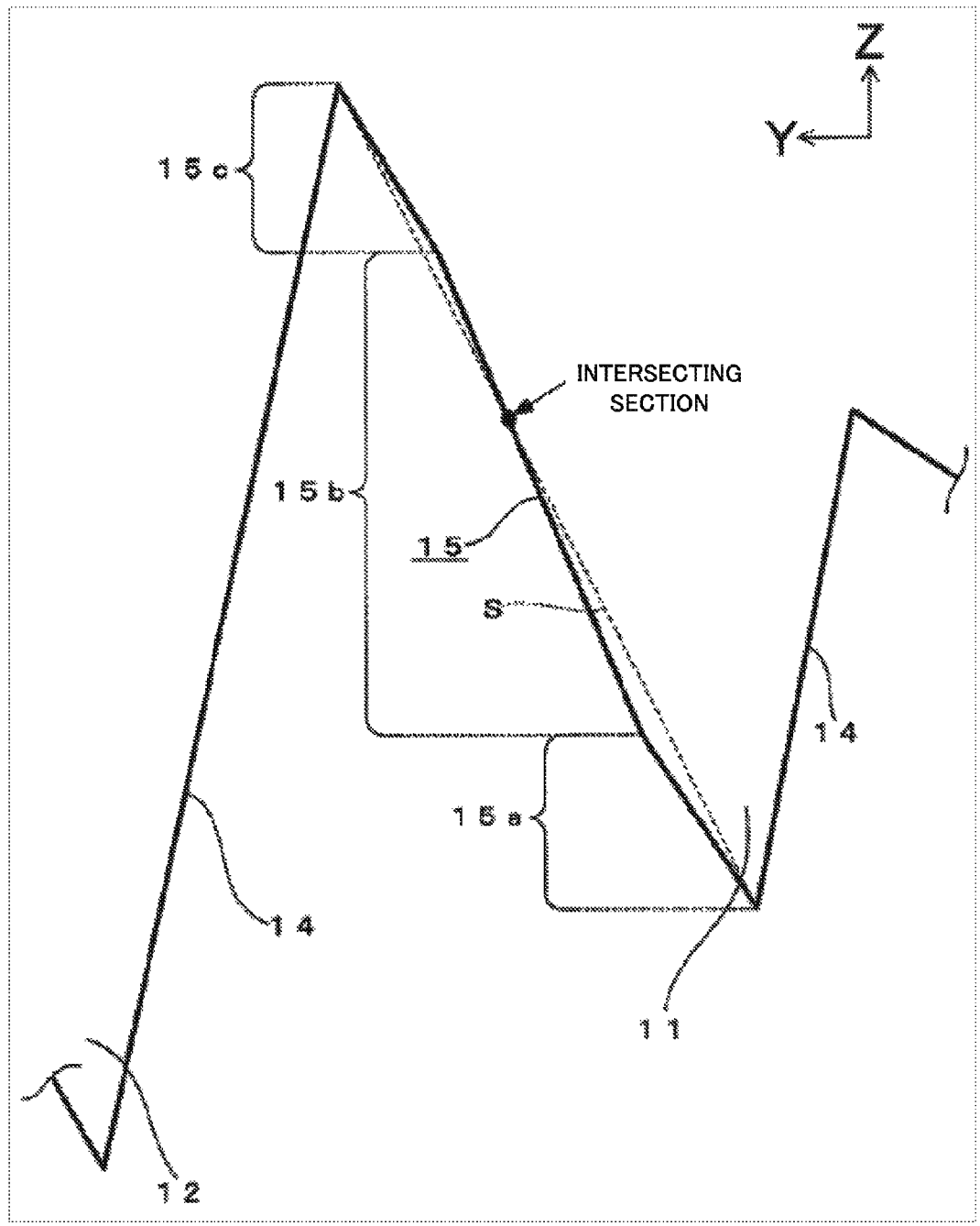
FIG. 7 is a main portion enlarged view showing the embodiment of the luminous flux control member according to the present invention.

Further, the surface shape of reflection surface 15 may be formed in a surface shape as shown in FIG. 7. However, in FIG. 7, although only reflection surface 15 of first projecting section 11 is illustrated for the sake of convenience, it is sufficient to employ a similar surface shape also in reflection surface 15 of second projecting section 12. That is, reflection surface 15 shown in FIG. 7 is divided into first reflection surface 15a having an extreme end section, second reflection surface 15b intersecting once virtual surface S connected to first reflection surface 15a on a base end section side, and third reflection surface 15c connected to second reflection surface 15b on a base end section side and including the base end section. More specifically, first reflection surface 15a is formed as an inclined surface (taper surface) that is inclined greater than virtual surface S with respect to optical axis OA (in other words, Z-axis in FIG. 7), so that the part of first reflection surface 15a except the extreme end section is positioned further outward in the radial direction than virtual surface S. Second reflection surface 15b is formed as an inclined surface (taper surface) which is inclined less than virtual surface S with respect to optical axis OA so that the part of second reflection surface 15b closer to the extreme end section side than the intersecting section with virtual surface S is positioned further outward in the radial direction than virtual surface S and the part of second reflection surface 15b closer to the base end section side than the intersecting section is positioned further inward in the radial direction than virtual surface S. Note that the intersecting section of second reflection surface 15b and virtual surface S has a circular shape around optical axis OA. Third reflection surface 15c is formed as an inclined surface (taper surface) which is inclined greater than virtual surface S with respect to optical axis OA so that the part of third reflection surface 15c except the base end section is positioned further inward in the radial direction than virtual surface S. Note that first reflection surface 15a and third reflection surface 15c may be parallel with each other.

By this means, the light of light source 6, which is incident on first reflection surface 15a and which has a relatively low intensity, and the light of light source 6, which is incident on third reflection surface 15c and which has a relatively high intensity, are reflected in directions in which the lights approach each other. In contrast, the light of light source 6, which is incident on second reflection surface 15b and which has an approximately medium intensity, is reflected to be offset to the right in FIG. 7 from the reflecting directions by first reflection surface 15a and third reflection surface 15c.

Then, reflected light from first reflection surface 15a and reflected light from third reflection surface 15c, which are reflected in a direction in which the lights approach each other, are synthesized on an illumination-target surface so that intensity of the synthesized light becomes medium and thus a difference between the intensity of the synthesized light and the intensity of the reflected light from second reflection surface 15b is reduced. As a result, since a gradient of intensity of light emitted from emission area 5 can be alleviated, the offset of light distribution due to the axis offset can be reliably suppressed. Further, since the shape of reflection surface 15 can be made a simple shape which is advantageous to the transcription of a metal mold shape and a separation from a metal mold, luminous flux control member 1 can be manufactured more easily.

Note that, in FIG. 7, although any of three divided surfaces 15a, 15b and 15c is formed as a flat surface, at least one of reflection surfaces 15a, 15b and 15c may be formed as a curved surface.

In addition to the above configuration, in the embodiment, as shown in FIG. 4, FIG. 6, and FIG. 7, refraction surface 14 is further formed as an inclined surface so that an extreme end section most distant from emission area 5 in optical axis OA direction is positioned further outward in the radial direction than the base end section that is the closest to emission area 5 in optical axis OA direction.

By this configuration, since the surface shape of refraction surface 14 can be made simple and made a shape which can be easily separated from a metal mold, luminous flux control member 1 can be manufactured more easily.

Incidentally, as shown in FIG. 6, luminous flux control member 1 in the embodiment, light source 6 is arranged on incident area 4 side opposite thereto and light source 6 is attached to luminous flux control member 1 after the center axis of light emitted from light source 6 is aligned with optical axis OA of luminous flux control member 1 (axis alignment). By this means, an optical apparatus of the present invention is configured. Even if an axis offset occurs by an attachment error of light source 6 at the time, a stable optical performance can be exhibited by the surface shape of reflection surface 15 described above. Note that axis alignment of control member 1 and light source 6 may be performed by mechanical positioning by engaging positioning structures (for example, abutting parts and engaging parts) of both parts 1 and 6 with each other or by optical positioning by optically detecting positioning marks of both parts 1 and 6.

Further, in the optical apparatus, it is preferable that first projecting section 11 is arranged so that 25% or more (more preferably, 30% or more) of the amount of light emitted from emission area 5 (light emitted by being controlled by luminous flux control member 1) passes through first projecting section 11. The configuration is similar to a configuration in which 25% or more (more preferably, 30% or more) of the amount of light emitted from emission area 5 is totally reflected by reflection surface 15 of first projecting section 11. Further, the arrangement can be realized by adjusting a forming position, size, and angle of reflection surface 15 of first projecting section 11.

With this configuration, since the influence of the amount of light reflected by reflection surface 15 of first projecting section 11 on the overall distribution of light of luminous flux control member 1 increases, the effect suppressing the offset of light distribution by the surface shape of reflection surface 15 becomes more outstanding.

EXAMPLE

In the embodiment, as to luminous flux control member 1 having reflection surface 15 arranged as shown in FIG. 7, a light distribution when an axis offset did not occur between luminous flux control member 1 and an LED as light source 6, and a light distribution when an axis offset occurred were calculated by simulation. However, 0.1 mm (Y-axis direction) was set as an attachment error of the LED which could be actually assumed. Further, the amount of light reflected by reflection surface 15 of first projecting section 11 was set to 34% of the effective amount of light emitted from emission area 5 after the light was emitted from the LED and entered inside luminous flux control member 1.

Figure 8:
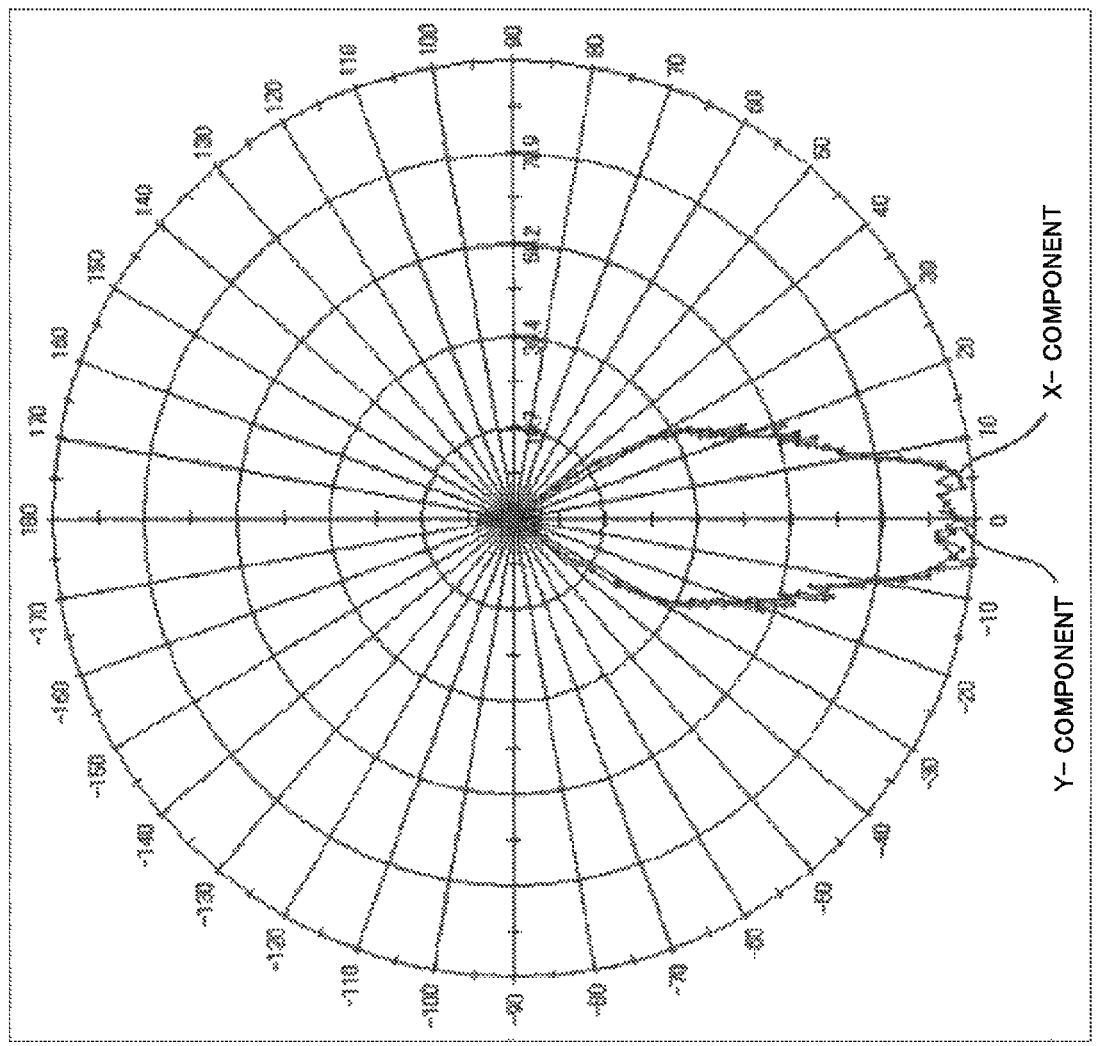
FIG. 8 is a designed light intensity characteristics graph showing the embodiment of the luminous flux control member according to the present invention.
Figure 9:
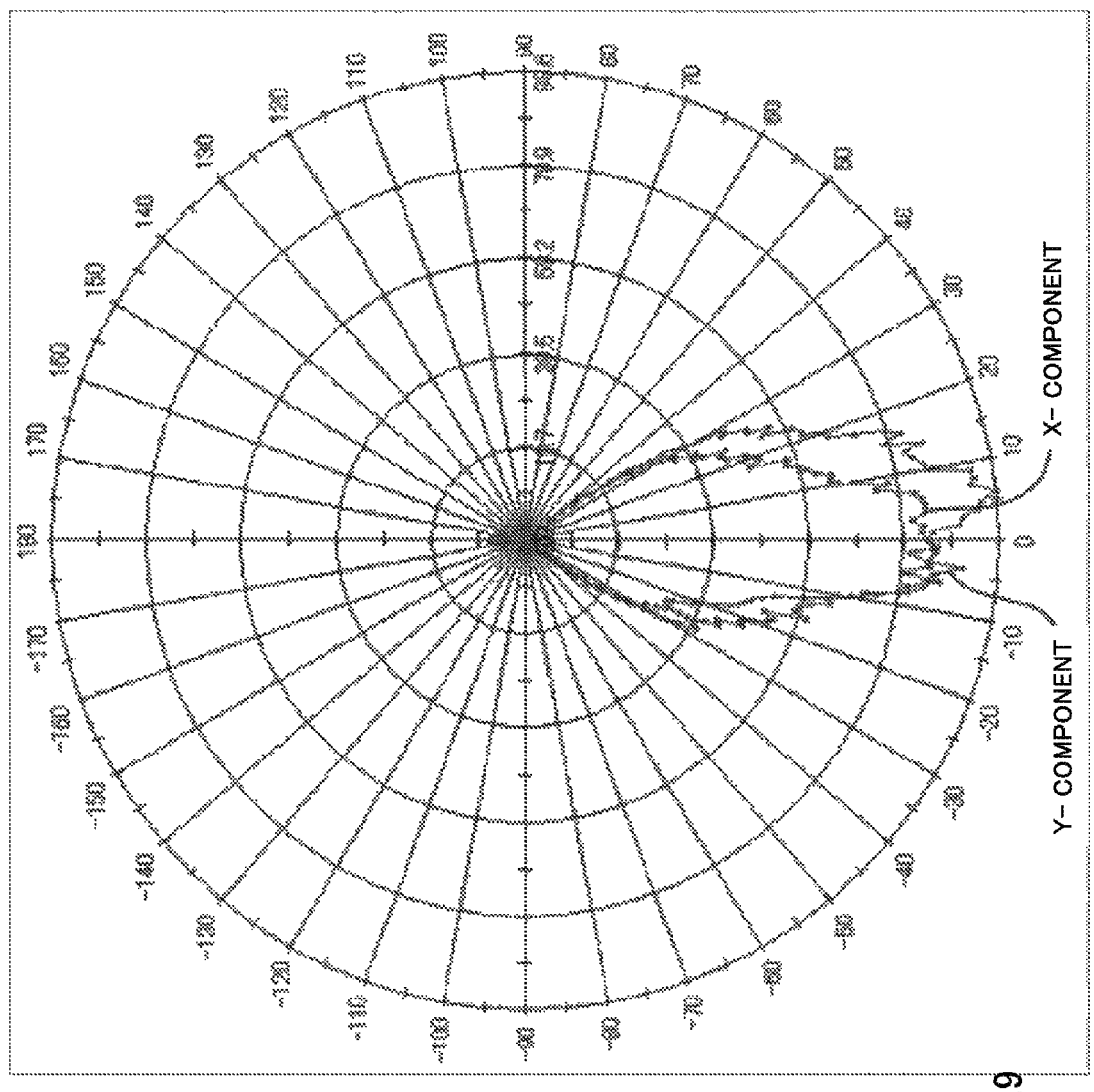
FIG. 9 is a light intensity characteristics graph showing the embodiment of the luminous flux control member according to the present invention when an axis offset occurs.

A light distribution when an axis offset did not occur, that is, a designed light distribution was as shown in FIG. 8, and a light distribution when an axis offset occurred was as shown in FIG. 9.

Note that FIG. 8 and FIG. 9 show distributions of a ratio (%) of intensity of light emitted from luminous flux control member 1 with respect to a radiation intensity of light from the LED, and the distributions correspond to a light distribution of light emitted from luminous flux control member 1. Further, in FIG. 8 and FIG. 9, angle 0° corresponds to the forward direction (illuminating direction) along the optical axis OA direction. Further, FIG. 8 and FIG. 9 show a component having a distribution that expands in the X-axis direction (X-component) and a component having a distribution that expands in the Y-axis direction (Y-component) about optical axis OA direction.

As shown in FIG. 8 and FIG. 9, in luminous flux control member 1 of the embodiment, it can be found that a variation of light distribution due to axis offset within an angle range of 0° to −10° can be suppressed to about 15% at a maximum.

Comparative Example

Figure 10:
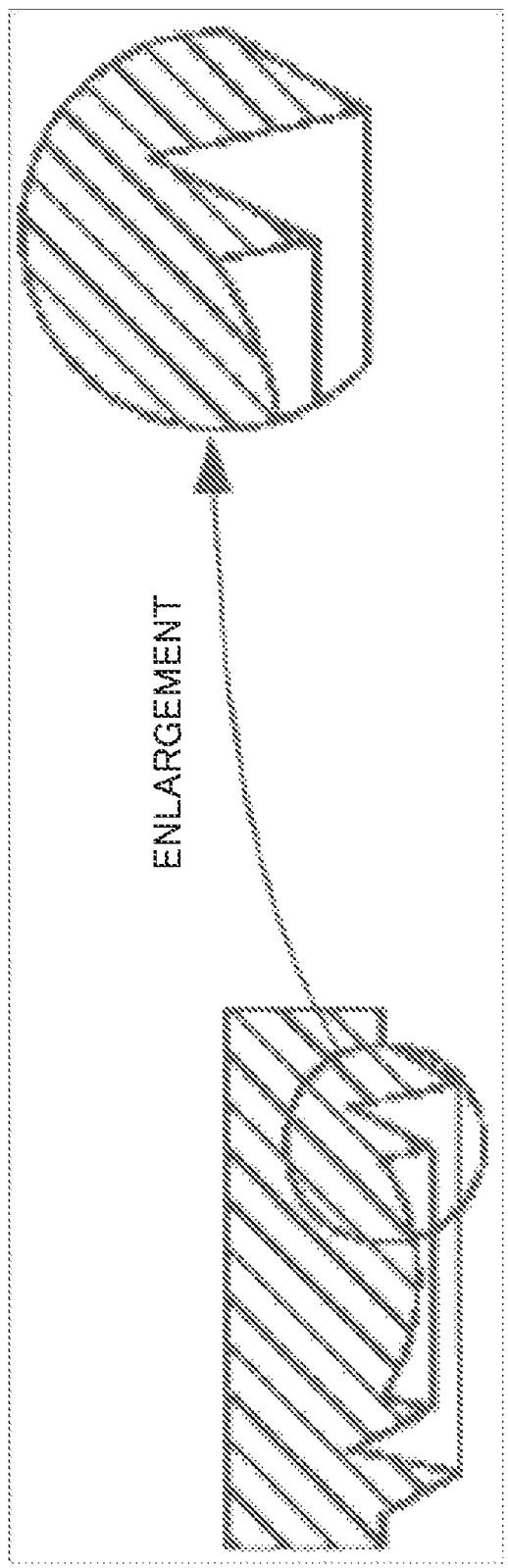
FIG. 10 is a longitudinal sectional view showing a luminous flux control member of a comparative example.
Figure 11:
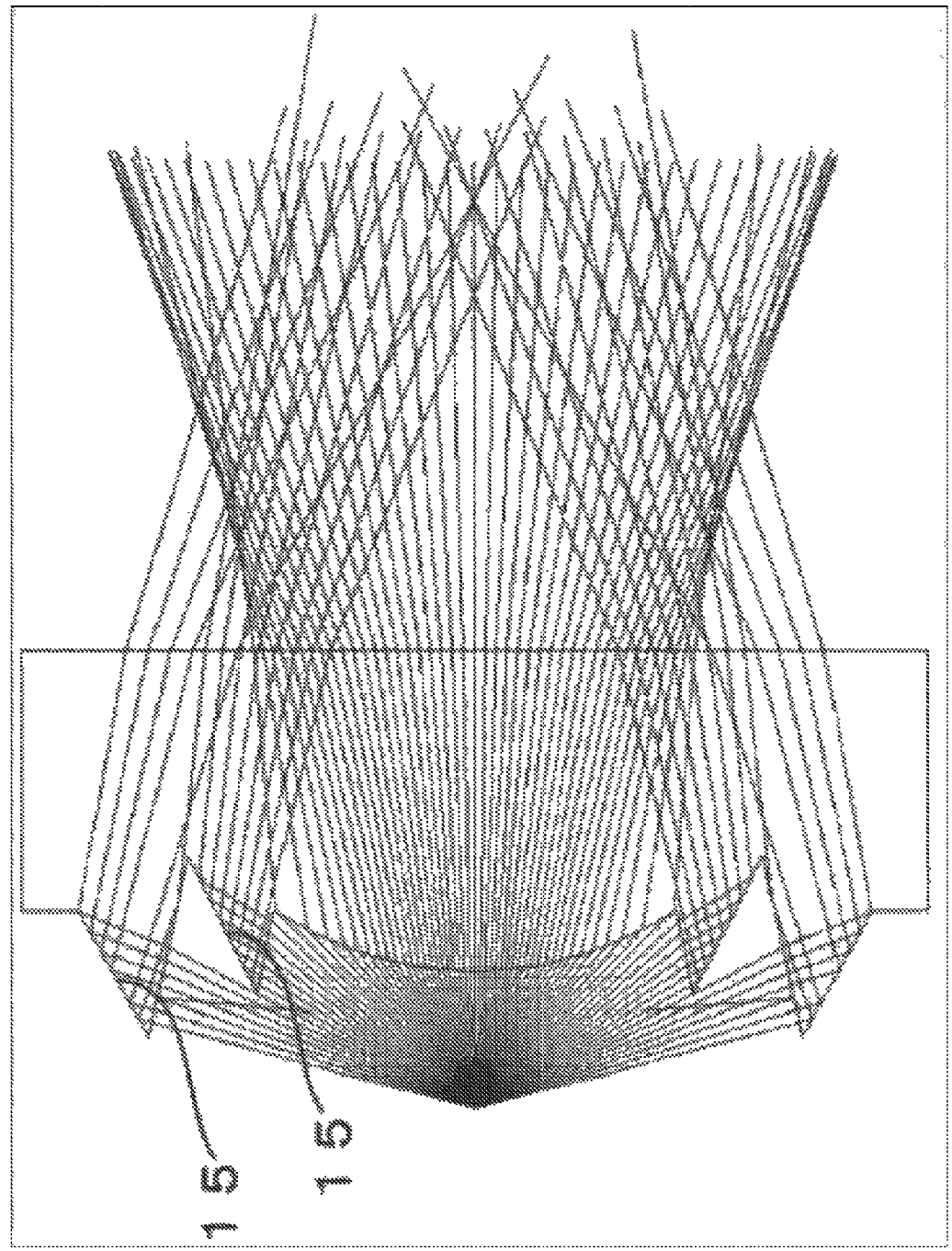
FIG. 11 is a light path view of the luminous flux control member of FIG. 10.

In a comparative example, as shown in FIG. 10, as to an arrangement in which only the surface shape of reflection surface 15 in the example described above was replaced with a flat surface, a light distribution when an axis offset to an LED did not occur and a light distribution when an axis offset to an LED occurred were calculated by simulation. Note that FIG. 11 shows a light path of light of an LED in the comparative example. As can be found also from FIG. 11, in reflection surface 15, which is formed a level surface, the arrangement of light entering reflection surface 15 did not change even after the light was reflected, and the gradient of intensity of light of the LED was reflected as is in the light emitted from the luminous flux control member.

Figure 12:
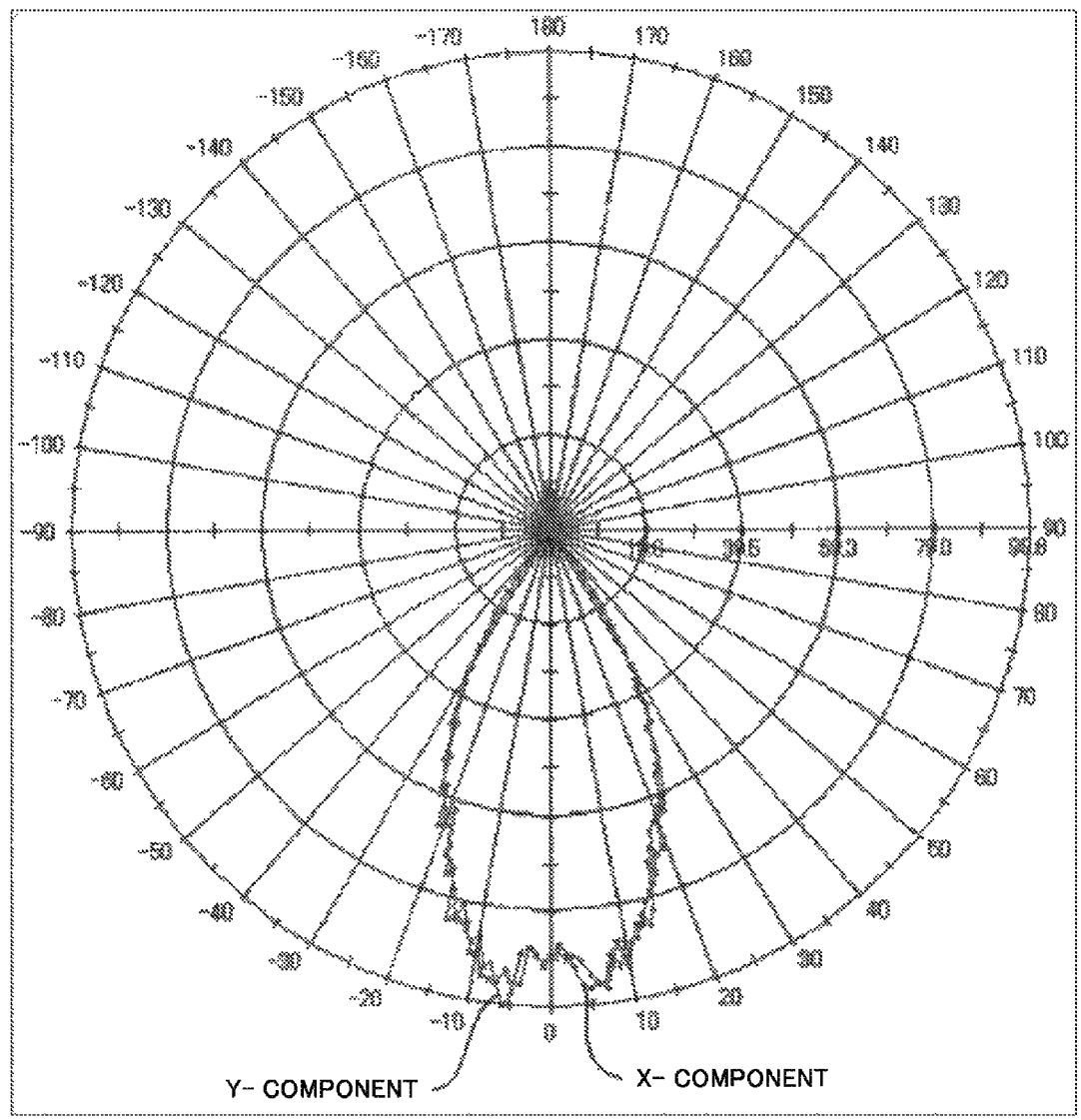
FIG. 12 a designed light intensity characteristics graph of the luminous flux control member of FIG. 10.
Figure 13:
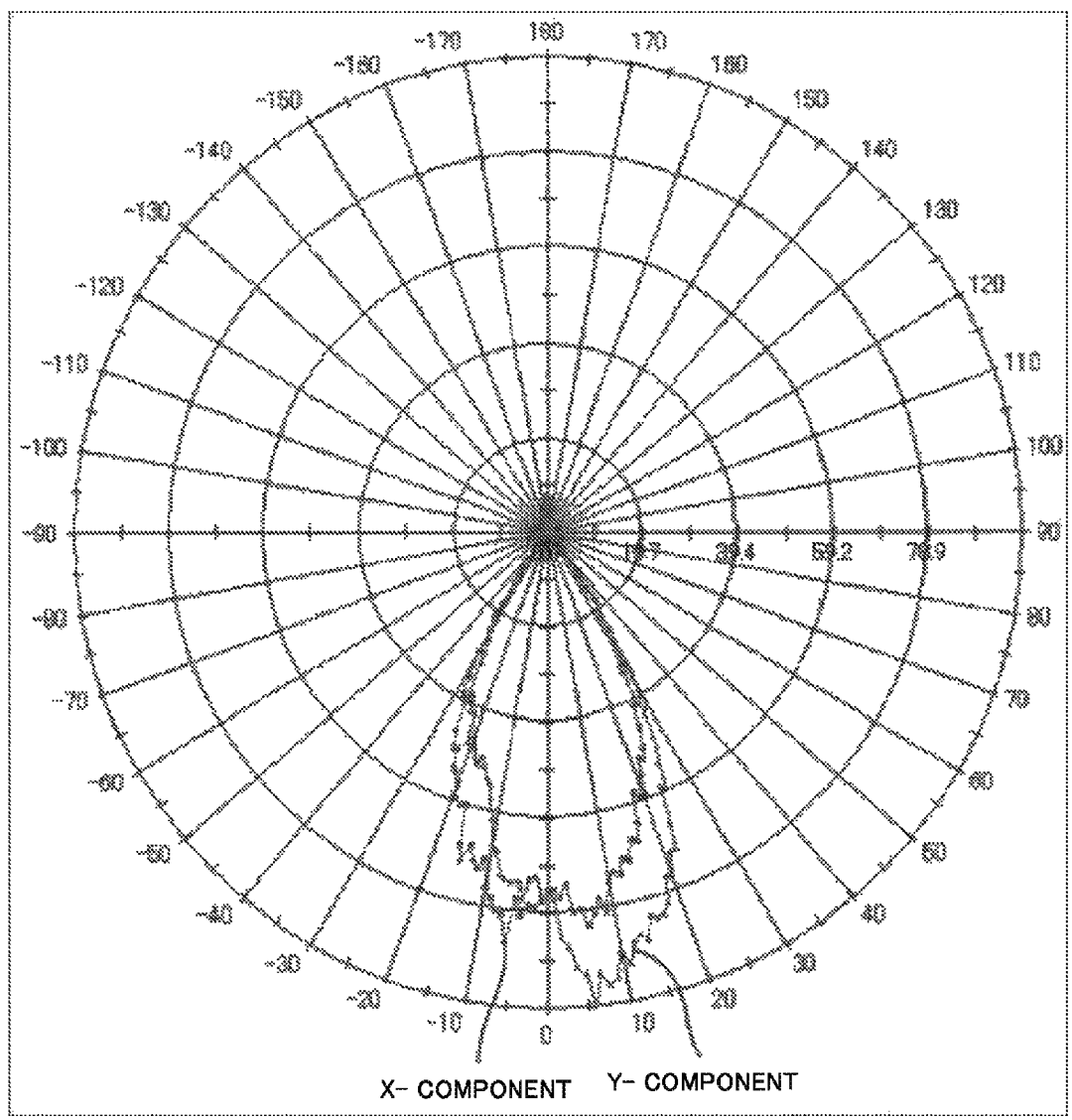
FIG. 13 is a light intensity characteristics graph of the luminous flux control member of FIG. 10 when an axis offset occurs.

In the luminous flux control member of the comparative example, a light distribution when an axis offset did not occur was as shown in FIG. 12, and a light distribution when an axis offset occurred was as shown in FIG. 13.

As shown in FIG. 12 and FIG. 13, it can be found that in luminous flux control member 1 of the comparative example, a variation of light distribution due to axis offset within an angle range of 0° to −10° exceeds 20% at a maximum.

Accordingly, it can be found that luminous flux control member 1 of the example is more advantageous to suppression of light distribution due to axis offset than the comparative example.

Note that the present invention is not limited to the embodiment described above and can be variously modified within a limit by which a feature of the present invention is not impaired.

For example, it is anticipated that a suppression effect of offset of light distribution by the surface shape of reflection surface 15 in the embodiment works favorably for not only axis offset but also for the dimensional error of reflection surface 15 (position and inclination errors) and the tilt of optical axis OA (that is, the tilt of light of light source 6 with respect to the center axis of light).

Further, the surface shape of reflection surface 15 is not limited to the polygonal surface shape as shown in FIG. 7 and may be a curved surface shape such as an S-curved surface and the like as long as the curved surface intersects virtual surface S once.

Further, luminous flux control member 1 in the embodiment may be also molded by a metal mold which employs a mold for molding a luminous flux control member having reflection surface 15 arranged as a flat surface as a base and obtained by fine processing of the base mold. In the case, a manufacturing cost can be lowered by making use of an existing facility.

Further, luminous flux control member 1 in the embodiment can be effectively applied to spot illumination, for example, illumination of a show window, illumination (flash) of an imaging camera mounted on a mobile phone, and the like.

REFERENCE SIGNS LIST

1 Luminous flux control member
4 Incident area
5 Emission area
11 First projecting section
12 Second projecting section
15 Reflection surface (second inclined surface)

The invention claimed is:

1. A luminous flux control member comprising:
an incident area on which light emitted from a light source is incident; and
an emission area which opposes the incident area in an optical axis direction and which emits light having entered the incident area, toward an illumination-target surface side, wherein:
the incident area comprises a projecting section which an annular shape about an optical axis when viewed from an optical axis direction and which has a cross section of a saw blade shape;
the projecting section comprises:
a first inclined surface on which part of the light emitted from the light source is incident and which refracts the incident light; and
a second inclined surface which is formed in a further outward position in a radial direction than the first inclined surface and which totally reflects the light having entered the projection section from the first inclined surface toward the emission area; and
the second inclined surface is formed in a surface shape so that an extreme end section of the second inclined surface which is most distant from the emission area is positioned more inward in the radial direction than a base end section which is closest to the emission area and the second inclined surface intersects once a virtual surface that is inclined with respect to the optical axis which connects between the extreme end section and the base end section.

2. A luminous flux control member according to claim 1, wherein the second inclined surface is formed in a polygonal surface shape in which a plurality of planes are connected to be bent sequentially from the extreme end section side to the base end section side.

3. A luminous flux control member according to claim 1, wherein:
the second inclined surface comprises:
a first reflection surface including the extreme end section;
a second reflection surface intersecting once the virtual surface connected with the base end section side of the first reflection surface; and
a third reflection surface connected with the base end section side of the second reflection surface and including the base end section;
the first reflection surface is formed as an inclined surface which is inclined greater than the virtual surface with respect to the optical axis so that a section except the extreme end section is positioned further outward in the radial direction than the virtual surface;
the second reflection surface is formed as an inclined surface which is inclined less than the virtual surface with respect to the optical axis so that a section that is closer to the extreme end section side than an intersecting section to the virtual plain is positioned further outward in the radial direction than the virtual surface and a section that is closer to the base end section side than the intersecting section is positioned more inward in the radial direction than the virtual surface; and
the third reflection surface is formed as an inclined surface which is inclined greater than the virtual surface with respect to the optical axis so that a section except the base end section is positioned more inward in the radial direction than the virtual surface.

4. The luminous flux control member according to claim 1, wherein the first inclined surface is formed as an inclined surface so that an extreme end section which is most distant from the emission area is positioned further outward in the radial direction than a base end section that is closest to the emission area.

5. An optical apparatus for illuminating light emitted from a light source to an illumination-target surface, wherein the luminous flux control member according to claim 1 is arranged in a position on an emission side of the light to the light source in a state that an incident area of the luminous flux control member faces the light source side and an optical axis of the luminous flux control member is aligned with the center axis of light emitted from the light source.

6. The optical apparatus according to claim 5, wherein 25% or more of the amount of light emitted from the emission area passes the projecting section in the incident area.

* * * * *